(12) United States Patent
Macidull

(10) Patent No.: US 7,810,305 B2
(45) Date of Patent: Oct. 12, 2010

(54) AUTOMATED FRUIT HARVESTING APPARATUS

(76) Inventor: John C. Macidull, 6569 Sand Wedge Ct., Alexandria, VA (US) 22312

( * ) Notice: Subject to any disclaimer, the term of this patent is extended or adjusted under 35 U.S.C. 154(b) by 0 days.

(21) Appl. No.: 12/393,810

(22) Filed: Feb. 26, 2009

(65) Prior Publication Data
US 2010/0212279 A1    Aug. 26, 2010

(51) Int. Cl.
*A01D 46/24* (2006.01)
(52) U.S. Cl. .................................. 56/334; 56/333
(58) Field of Classification Search ............... 56/334, 56/336, 328, 332, 333; 30/261, 233, 266
See application file for complete search history.

(56) References Cited

U.S. PATENT DOCUMENTS

| | | | | |
|---|---|---|---|---|
| 1,626,402 A | * | 4/1927 | Fryman | 56/334 |
| 2,288,682 A | * | 7/1942 | Chittenden | 56/334 |
| 2,475,687 A | * | 7/1949 | Baker | 56/333 |
| 2,545,072 A | * | 3/1951 | Denman | 56/332 |
| 2,711,625 A | * | 6/1955 | Bullock | 56/332 |
| 2,968,907 A | * | 1/1961 | Bernheim et al. | 56/332 |
| 2,990,669 A | * | 7/1961 | Klemm, Jr. | 56/334 |
| 3,165,880 A | * | 1/1965 | Buie, Jr. | 56/336 |
| 3,199,280 A | * | 8/1965 | Wilczek | 56/334 |
| 3,420,046 A | * | 1/1969 | Johnson et al. | 56/330 |
| 3,464,529 A | * | 9/1969 | Horsky, Jr. | 193/7 |
| 3,473,312 A | * | 10/1969 | Holt | 56/332 |
| 3,489,258 A | * | 1/1970 | Stokes | 193/7 |
| 3,538,695 A | * | 11/1970 | Carnell | 56/332 |

(Continued)

FOREIGN PATENT DOCUMENTS

CN    1844900 A    10/2006

(Continued)

OTHER PUBLICATIONS http://ieeexplore.ieee.org/xpl/freeabs_all.jsp?tp=&arnumber=4338567&isnumber=4338503 An end-effector for spherical fruit harvesting robot was developed. This end-effector is a multi-sensory one that is universal for spherical fruit such as tomatoes, apples and citrus. It performs fruit singulation with a vacuum suction pad.

(Continued)

*Primary Examiner*—Árpád Fábián-Kovács
(74) *Attorney, Agent, or Firm*—Russ Weinzimmer; Russ Weinzimmer & Associates (57) ABSTRACT

A harvesting apparatus for harvesting generally spherical fruit by severing each fruit from its stem and conveying it using air flow into a receptacle. The harvesting apparatus includes a tubular body with a clamshell cutter for severing items of fruit from their stems, and a retractable throat that is able to restrict and then allow passage of the fruit. The apparatus further includes a control unit that can control the clamshell cutter and the throat. A funnel-shaped orifice is preferably included at the harvesting end of the tubular body. When a piece of fruit enters the harvesting end, it contacts the throat and blocks the airflow. The control unit senses the resulting pressure drop, and then activates the clamshell cutter while causing the throat to open so as to allow the piece of fruit to pass through the tubular body and into the receptacle.

20 Claims, 10 Drawing Sheets

U.S. PATENT DOCUMENTS

| | | | | |
|---|---|---|---|---|
| 3,559,387 | A | * | 2/1971 | Myers .................... 56/334 |
| 3,564,826 | A | * | 2/1971 | Middleton, Jr. ........... 56/328.1 |
| 3,591,949 | A | * | 7/1971 | Connery .................. 56/332 |
| 3,646,741 | A | | 3/1972 | Edwards et al. |
| 3,664,104 | A | * | 5/1972 | Jamshidi ................. 56/332 |
| 3,756,001 | A | * | 9/1973 | Macidull ................. 56/328.1 |
| 3,768,239 | A | | 10/1973 | Staats, Sr. et al. |
| 3,898,785 | A | * | 8/1975 | Chew ..................... 56/332 |
| 3,913,307 | A | * | 10/1975 | Cardinal, Jr. ............ 56/328.1 |
| 3,969,878 | A | * | 7/1976 | Morganeier ............... 56/328.1 |
| 4,000,602 | A | * | 1/1977 | Cardinal, Jr. ............ 56/328.1 |
| 4,060,962 | A | * | 12/1977 | Cooper ................... 56/336 |
| 4,388,798 | A | * | 6/1983 | Gerber ................... 56/334 |
| 4,501,113 | A | * | 2/1985 | Gerber ................... 56/328.1 |
| 4,519,193 | A | | 5/1985 | Yoshida et al. |
| 4,674,265 | A | * | 6/1987 | Gerber ................... 56/332 |
| 4,718,223 | A | | 1/1988 | Suzuki et al. |
| 5,005,347 | A | * | 4/1991 | Kedem et al. ............. 56/328.1 |
| 5,426,927 | A | | 6/1995 | Wang et al. |
| 7,540,137 | B2 | * | 6/2009 | Gray ..................... 56/328.1 |
| 7,695,220 | B2 | * | 4/2010 | Bryan et al. ............. 406/84 |
| 2008/0010961 | A1 | | 1/2008 | Gray |

FOREIGN PATENT DOCUMENTS

| | | | |
|---|---|---|---|
| CN | 11019484 | A | 8/2007 |
| CN | 11019485 | A | 8/2007 |
| CN | 21004838 | Y | 1/2008 |
| ES | 2296452 | AA | 4/2008 |
| JP | 01067124 | A * | 3/1989 |
| SU | 934975 | B * | 6/1982 |
| WO | 2007088225 | A1 | 8/2007 |
| WO | 2008008972 | A2 | 1/2008 |

OTHER PUBLICATIONS

"A Multi-Sensory End-Effector for Spherical Fruit Harvesting Robot" Proceedings of the IEEE.

* cited by examiner

AUTOMATED FRUIT HARVESTING APPARATUS

FIELD OF THE INVENTION

The invention generally relates to agricultural harvesting apparatus, and more specifically to devices for automatically picking fruit.

BACKGROUND OF THE INVENTION

Harvesting devices are useful for reducing the amount of manual labor that is required to harvest agricultural crops. For example, a very large harvesting machine can typically be used by a single operator to harvest many acres of wheat, corn, tomatoes, and other crops where the plant itself is necessarily destroyed during the harvesting operation. However, the picking of tree-grown and vine-grown fruits, such as oranges and apples, where the parent plant sustains only minimal damage during harvesting, is typically done by hand, utilizing ladders, clippers (for example in the case of lemons), bags, and transfer boxes, and is therefore highly labor intensive.

Various automated devices are known for reducing the time and labor required for fruit picking, so as to lower the overall cost of the fruit that is harvested. However, these known fruit harvesting devices typically cut or twist the fruit from their stems using complex technology that requires substantial maintenance, such as whirling blades, iris blades, fruit grabbers and twisters, or even lasers. Moreover, the complexity of these known mechanisms significantly increases the likelihood that a malfunction could damage some of the harvest. In addition, many of these known devices do not automate the step of bringing each item of fruit to a receiving container after picking, and therefore they can provide only a minimal improvement in speed and efficiency as compared to picking by hand.

The high cost of manufacturing and maintaining these known automated picking devices, the limited reductions that they offer in labor costs, and the potential of damaging valuable crops if the device malfunctions, have largely prevented these automated picking devices from being economically practical.

SUMMARY OF THE INVENTION

An automated fruit harvesting apparatus is claimed that is simple to manufacture and to maintain, highly unlikely to malfunction or damage crops, and significantly faster and more efficient than previously known picking devices. The claimed apparatus automatically severs an item of fruit from its stem using a "clamshell" cutting mechanism that is located near the distal, or harvesting end of the tubular body. The claimed apparatus then uses air flow to convey the item of fruit through a tubular body and a flexible conduit, and into a receiving container. An inflatable throat located within the tubular body is able to alternately restrict and then allow the passage of each item of fruit.

An automatic control unit is able to sense a reduction in air pressure caused by contact between the piece of fruit and the inflatable throat. When the reduction in pressure is sensed, the automatic control unit actuates the clamshell cutting device, and then opens the inflatable throat so as to allow the harvested item of fruit to pass through the tubular body and flexible conduit, and into the receiving container.

One general aspect of the present invention is a harvesting apparatus for harvesting generally spherical fruit. The harvesting apparatus includes an elongated tubular body having a harvesting end and a discharge end, the elongated tubular body being configured so as to allow a piece of fruit to pass therethrough, a clamshell cutting device located within the harvesting end, the clamshell cutting device including a pair of opposing blades, the opposing blades being substantially shaped as partial spheres, with cutting edges that can be brought together by a pivotal motion of the blades, thereby severing the piece of fruit from an attached stem and allowing the piece of fruit to travel through the elongated tubular body and emerge from the discharge end, and a clamshell drive mechanism that can be actuated so as to cause the pair of opposing blades to pivot, thereby bringing their cutting edges together and then separating them.

In preferred embodiments, the clamshell drive mechanism includes a pneumatic piston and/or a linear solenoid. Some preferred embodiments further include a manual cutter actuator that enables a user to manually actuate the clamshell drive mechanism. In other preferred embodiments the harvesting end includes a funnel-shaped orifice that tends to guide pieces of fruit into the harvesting end of the tubular body.

In certain preferred embodiments the elongated tubular body is able to conduct a flow of air through its length, so as to draw a piece of fruit into the harvesting end and through the tubular body to the discharge end. Some of these embodiments further include a retractable throat, located within the harvesting end, and positioned so as to be in close proximity to the piece of fruit when the piece of fruit is drawn into the harvesting end, the close proximity thereby causing at least a partial blockage of the flow of air, and a consequent reduction of air pressure within the elongated tubular body. In some of these embodiments the retractable throat includes an inflatable member that is inflatable so as to block passage of the piece of fruit through the elongated tubular body, the inflatable member being deflatable so as to allow passage of the piece of fruit through the elongated tubular body.

Other of these embodiments further include a control unit that is able to sense the reduction of air pressure within the elongated tubular body, actuate the clamshell drive mechanism, thereby severing the piece of fruit from the stem, and cause the retractable throat to retract, thereby allowing the piece of fruit to pass through the tubular body to the discharge end. In some of these embodiments, the control unit includes an air pressure sensor that is able to sense the reduction of air pressure, the air pressure sensor being located between the retractable throat and the discharge end. In other of these embodiments, the control unit includes a timer, and is able to automatically repeat the actuation of the clamshell drive mechanism if the reduction of air pressure persists for a specified duration of time after the actuation of the clamshell drive mechanism.

Preferred embodiments further include a flexible conduit cooperative with the discharge end of the elongated tubular body, the flexible conduit being able to convey the piece of fruit from the discharge end to a receiving container. Other preferred embodiments further include comprising a receiving container suitable for collection of pieces of fruit after they have passed through the elongated tubular body and been discharged from the discharge end.

Another general embodiment is a harvesting apparatus for harvesting generally spherical fruit. The harvesting apparatus includes the following elements:

an elongated tubular body having a harvesting end and a discharge end, the harvesting end having a funnel-shaped orifice that tends to guide pieces of fruit into the harvesting end, the elongated tubular body being configured so as to enable conduction of a flow of air through its length, thereby drawing a piece of fruit into the harvesting end and through the tubular body to the discharge end;

a retractable throat, located within the harvesting end, and positioned so as to be in close proximity to the piece of fruit when the piece of fruit is drawn into the harvesting end, the close proximity thereby causing at least a partial blockage of the flow of air, and a consequent reduction of air pressure within the elongated tubular body;

a clamshell cutting device located within the harvesting end, the clamshell cutting device including a pair of opposing blades, the opposing blades being substantially shaped as partial spheres, with cutting edges that can be brought together by a pivotal motion of the blades, thereby severing the piece of fruit from an attached stem and allowing the piece of fruit to travel through the elongated tubular body and emerge from the discharge end;

a clamshell drive mechanism that can be actuated so as to cause the pair of opposing blades to pivot, thereby bringing their cutting edges together and then separating them; and a control unit that is able to:

sense the reduction of air pressure within the elongated tubular body;

actuate the clamshell drive mechanism, thereby severing the piece of fruit from the stem; and cause the retractable throat to retract, thereby allowing the piece of fruit to pass through the tubular body to the discharge end.

In preferred embodiments, the clamshell drive mechanism includes a pneumatic piston and/or a linear solenoid. Some preferred embodiments, further include a manual cutter actuator that enables a user to manually actuate the clamshell drive mechanism. In some of these embodiments, the retractable throat includes an inflatable member that is inflatable so as to block passage of the piece of fruit through the elongated tubular body, the inflatable member being deflatable so as to allow passage of the piece of fruit through the elongated tubular body.

In various preferred embodiments the control unit includes an air pressure sensor that is able to sense the reduction of air pressure, the air pressure sensor being located between the retractable throat and the discharge end. In certain preferred embodiments the control unit includes a timer, and is able to automatically repeat the actuation of the clamshell drive mechanism if the reduction of air pressure persists for a specified duration of time after the actuation of the clamshell drive mechanism. Other preferred embodiments further include a flexible conduit cooperative with the discharge end of the elongated tubular body, the flexible conduit being able to convey the piece of fruit from the discharge end to a receiving container. And still further preferred embodiments include a receiving container suitable for collection of pieces of fruit after they have passed through the elongated tubular body and been discharged from the discharge end.

BRIEF DESCRIPTION OF THE DRAWINGS

The invention will be more fully understood by reference to the detailed description, in conjunction with the following figures, wherein.

DETAILED DESCRIPTION OF PREFERRED EMBODIMENTS

Figure 1:
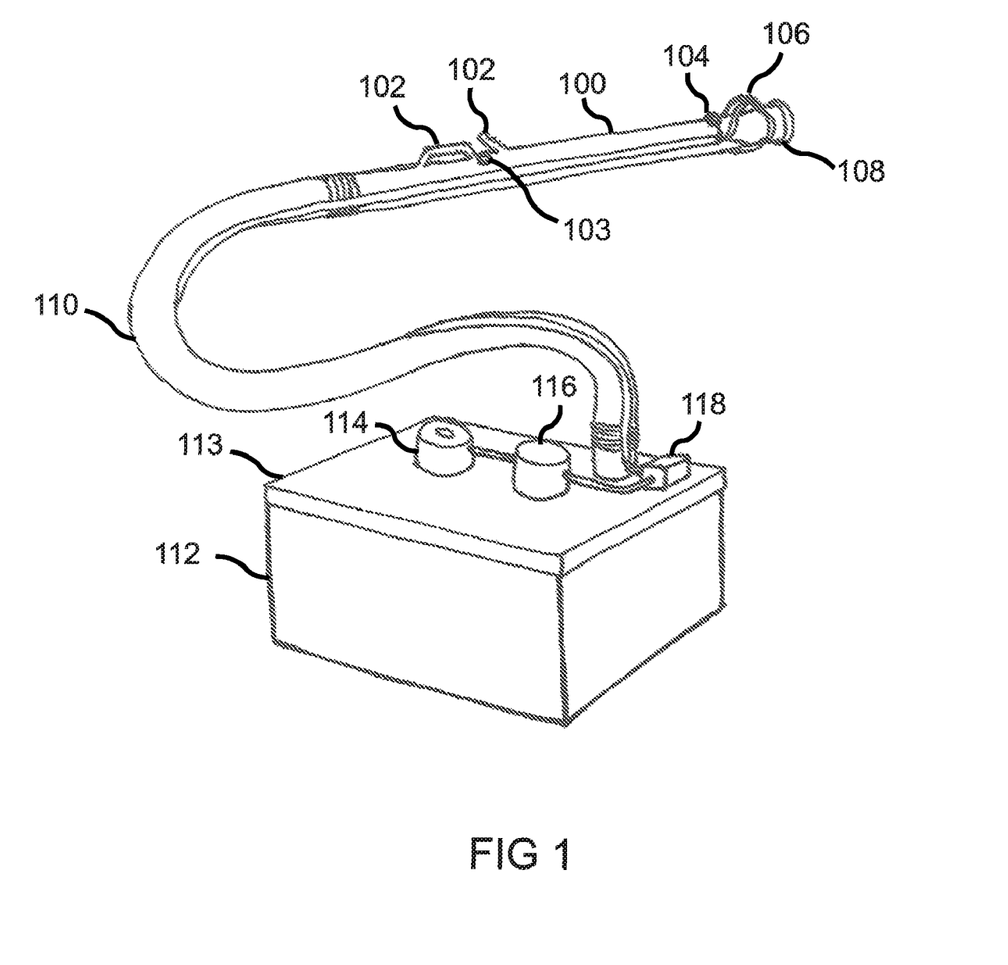
FIG. 1 is an illustration of a preferred embodiment of the complete apparatus of the invention.

FIG. 1 is an illustration of a preferred embodiment of the present invention. A tubular body portion 100 is shown with handles 102 and a cutter switch 103. Also mounted upon the tubular body are a pressure sensor 104, diaphragm manifold connections 106, and a harvesting end 108. The tubular body 100 is connected to a receiving container 112 by a flexible conduit 110. The receiving container 112 has a closure top 113. The top also forms the support for a vacuum pump 114, diaphragm chamber 116, and control unit 118. In similar embodiments, the receptacle 112 and its top 113 are formed in other shapes, such as cylindrical. Preferably, where design and economy permits, certain of these components are constructed using composite materials that are both strong and light in weight.

Figure 2:
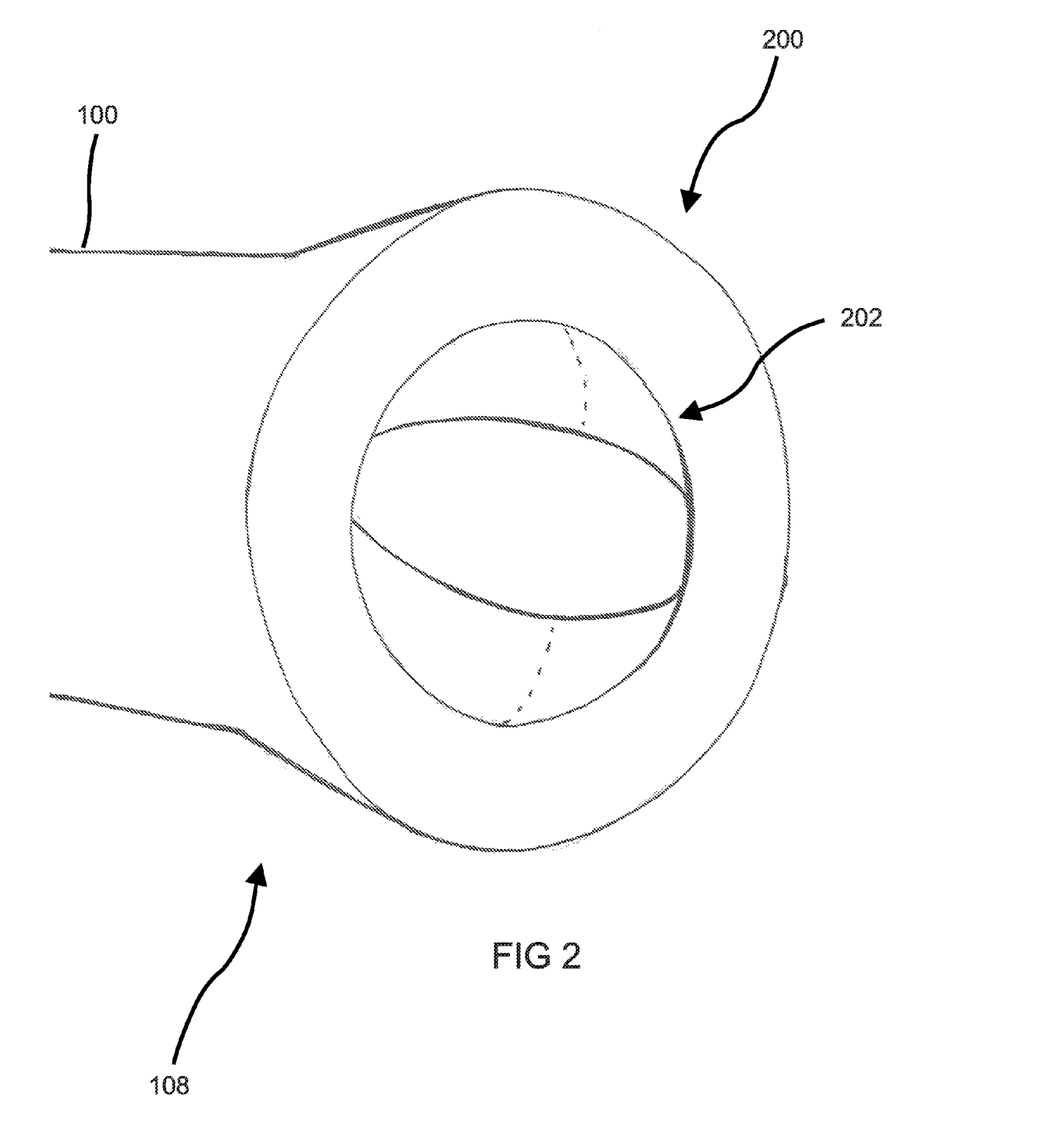
FIG. 2 is an enlarged oblique angle illustration of the harvesting end of the tubular body and the clamshell cutter device.

FIG. 2 is an enlarged oblique angle illustration of a preferred embodiment the cutter head 200 at the harvesting end 108 of the tubular body 100, which includes a clamshell cutter device 202. The illustration shows the clamshell cutter device 202 in a partially opened position. When the cutter head 200 is placed near a piece of fruit, a flow of air into the cutter head pulls the piece of fruit into the cutter head 200. When the piece of fruit enters the cutter head 200, it blocks the flow of air and thereby causes a reduction of the air pressure within the cutter head 200. A control unit senses this drop in pressure, and actuates the clamshell cutter device 202, causing it to quickly close, thereby severing the piece of fruit from its stem. Note that throughout this document the term "piece of fruit" refers generically to any agricultural product for which each item is substantially spherical in shape and is harvested separately by disconnection of the item from a parent plant without causing substantial damage to the parent plant. Examples include tree grown fruits such as apples, oranges, and lemons, as well as vine grown agricultural products such as tomatoes.

Figure 3:
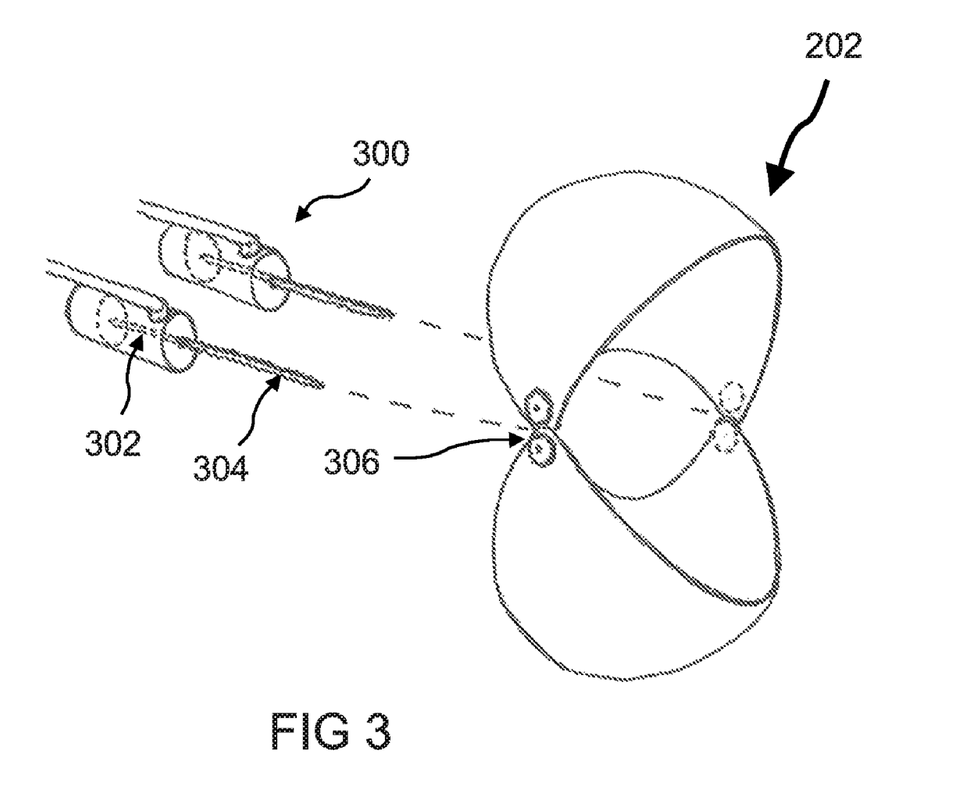
FIG. 3 is an exploded view illustration of a preferred embodiment of the clamshell cutter device and two cutter actuators.

FIG. 3 is an exploded illustration of a preferred embodiment of the clamshell cutter device 202 and two cutter actuators 300. In this figure, each cutter actuator 300 includes a pneumatic piston 302 that drives a toothed rack 304. A small gear 306 is affixed to each side of the top half of the clamshell cutter device 202, as well as to each side of the bottom half of the clamshell cutter device 202. The gears 306 on each side of the clamshell cutter device 202 are affixed near hinge joints that join the two halves of the clamshell cutter device 202, enabling the clamshell cutter device 202 to open and close. The toothed rack 304 fits in between each pair of gears 306. Each toothed rack 304 is attached to and driven by the pneumatic piston 302. Linear movement of the toothed racks 304 by the pneumatic pistons 302 thereby causes the gears 306 to rotate, thereby causing the clamshell cutter device 202 to open and close.

Figure 4A:
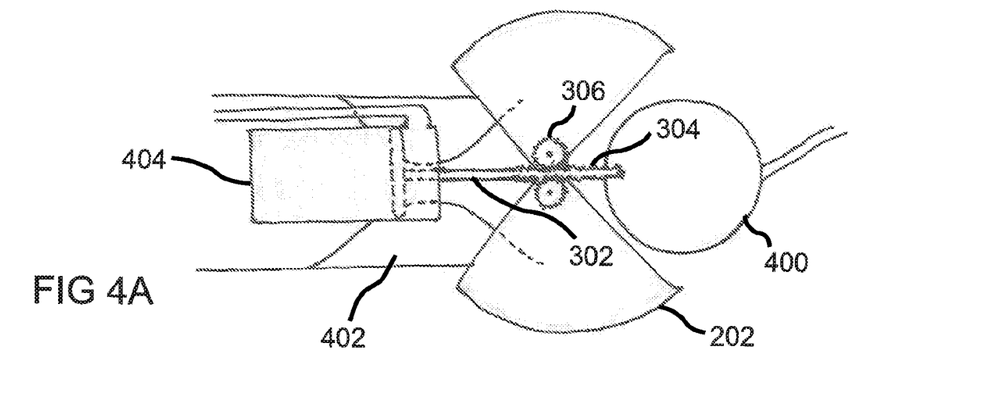
FIG. 4A is a side view illustration of a preferred embodiment of the invention that includes the clamshell cutter device and cutter actuators shown in FIG. 3, with the clamshell cutter device shown in a fully open configuration.

FIG. 4A is a side view illustration of the preferred embodiment of FIG. 3, shown with the clamshell cutter device 202 in a fully open configuration. A spherical piece of fruit 400 is shown being drawn into the cutter head 200 at the harvesting end of the tubular body 100. Once the fruit 400 makes contact with an inflated throat 402, the air flow through the tubular body 100 is blocked, the air pressure within the tubular body 100 drops, and a control unit senses the drop in pressure. In preferred embodiments, the control unit includes a pressure-sensing valve that is in communication with the cutter actuators 300.

Upon sensing the pressure drop, the control unit causes air to flow into the pneumatic cylinder 404, thereby pushing an enclosed piston 302 away from the clamshell cutter device 202, and causing the toothed rack 304 to move backwards and rotate the gears 306 with which it is engaged in such a manner as to move the two halves of the clamshell cutter device 202 towards each other.

Figure 4B:
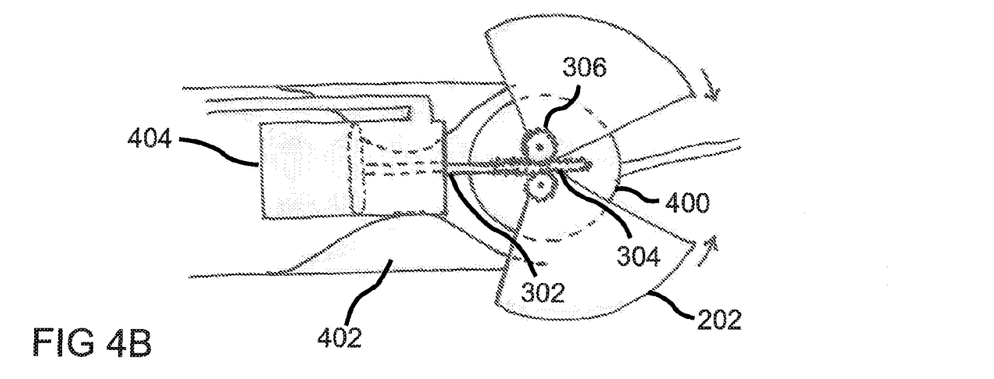
FIG. 4B is a side view illustration of the preferred embodiment of FIG. 4A, with the clamshell cutter device shown in a partially open configuration.

FIG. 4B is a side view illustration of the preferred embodiment shown in FIG. 4A, the clamshell cutter device 202 shown in a partially open configuration. In this figure, the piston 302 has begun to move, and the clamshell cutter device 202 has begun to close. The control unit also includes a diaphragm actuator that can inflate and deflate the diaphragm of the inflatable throat 402. Upon sensing the drop in air pressure, the control unit allows air to escape from the inflatable throat 402, thereby causing the throat 402 to collapse, and enabling the fruit 400 to pass through the now deflated throat 402 once the fruit stem is severed.

Figure 4C:
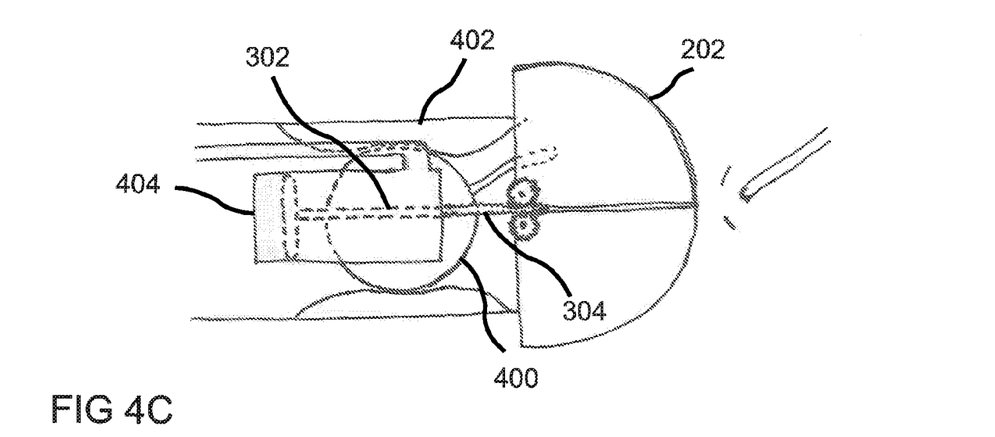
FIG. 4C is a side view illustration of the preferred embodiment of FIG. 4A, with the clamshell cutter device shown in a closed configuration.

FIG. 4C is a side view illustration of the preferred embodiment shown in FIG. 4A, with the clamshell cutter device 202 in a closed configuration. The piston 302 is fully extended away from the clamshell cutter device 202, and the toothed rack 306 has rotated the gears such that the top half and bottom half of the clamshell cutter device 202 have come together. Having previously sensed the drop in air pressure due to the proximity of the fruit 400 to the inflatable throat 402, the control unit has allowed a sufficient amount of air to escape from the interior of the inflatable throat 402, so as to enable the fruit 400 to pass through the inflatable throat 402, and eventually through the flexible conduit 110 and into the receptacle 112. Once the fruit 400 has passed through the inflatable throat 402 and into the interior of the tubular body 100, air is able to flow through the tubular body 100 at a high enough volume and speed to enable normal activation of the mechanism to pick a subsequent item of fruit even before the previously picked item of fruit has reached the receptacle 112. This allows for a high picking speed, and greatly enhances the economic practicality of the invention.

Figure 5:
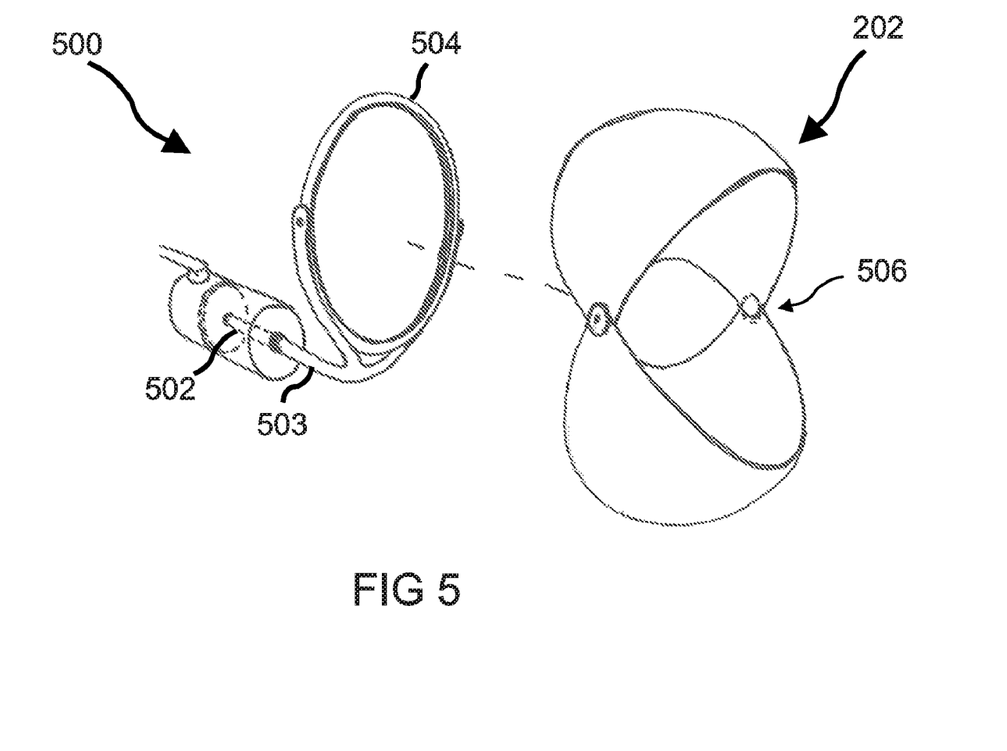
FIG. 5 is an exploded view illustration of a preferred embodiment of the clamshell cutter device that includes a single cutter actuator.

FIG. 5 is an exploded illustration of a preferred embodiment of the clamshell cutter device 202 that includes a single cutter actuator 500. In this figure, the cutter actuator 500 includes a pneumatic piston 502 that drives a piston rod 503, which in turn drives a ring 504. A hinge joint 506 on either side of the clamshell cutter device 202 joins the two halves of the clamshell cutter device 202, enabling the clamshell cutter device 202 to close about the hinge joint 506. The ring 504 fits against the rear side of the clamshell cutter device 202. The ring 504 is attached to and driven by a piston rod 503, which in turn is driven by the pneumatic piston 502 when air is introduced into the system.

Figure 6A:
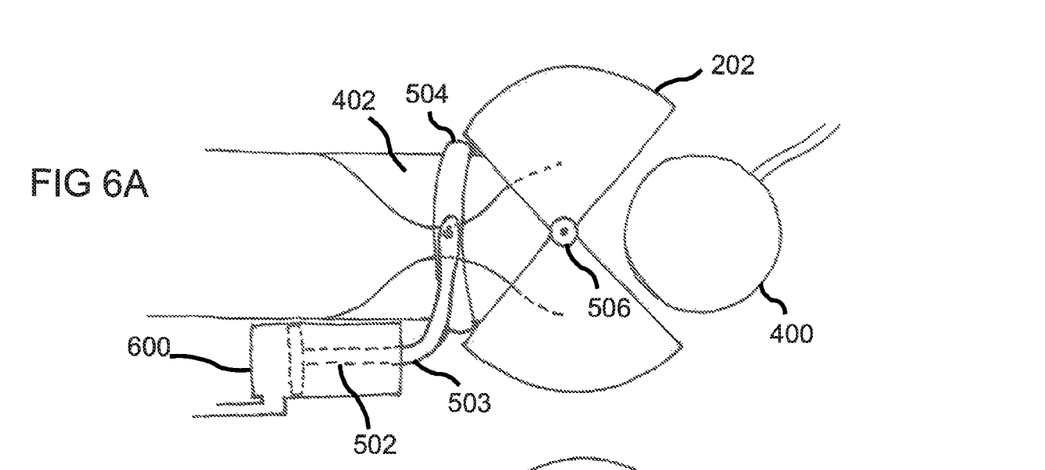
FIG. 6A is a side view illustration of a preferred embodiment of the invention that includes the clamshell cutter device and the cutter actuator shown in FIG. 5, with the clamshell cutter device shown in a fully open configuration.

FIG. 6A is a side view illustration of the preferred embodiment of FIG. 5, with the clamshell cutter device 202 shown in the fully open configuration. A spherical piece of fruit 400 is shown as being drawn into the harvesting end of the tubular body 100. When the fruit 400 makes contact with the inflated throat 402, it blocks the flow of air through the tubular body 100 and causes a drop in the pressure of the air in the tubular body 100, which is sensed by a control unit. Upon sensing the pressure drop, the control unit causes air to flow into a pneumatic cylinder 600. When air is fed into the cylinder 600, the piston 502 contained therein moves towards the clamshell cutter device 202. As a result, the driven ring 504 moves forward toward the rear side of the clamshell cutter device 202. This forward motion of the ring 504 causes the top half and the bottom half of the clamshell cutter device 202 to rotate about the hinge joint 506 in a manner so as to move the top half and the bottom half of the clamshell cutter device 202 toward each other.

Figure 6B:
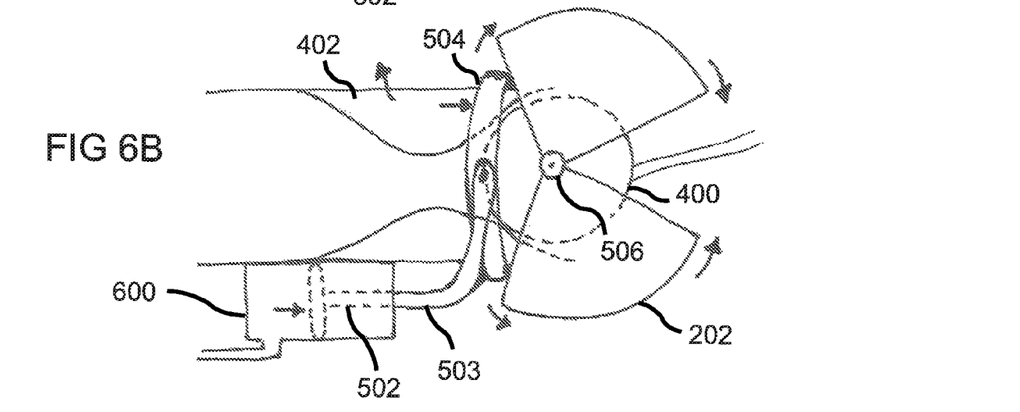
FIG. 6B is a side view illustration of the preferred embodiment of FIG. 6A, with the clamshell cutter device shown in a partially closed configuration.

FIG. 6B is a side view illustration of the preferred embodiment of FIG. 6A, showing the clamshell cutter device 202 in a partially closed configuration. In this figure, the piston 502 has begun to move, and the clamshell cutter device 202 has begun to close. Upon sensing the drop in air pressure, the control unit also has allowed some air to escape from the interior of the inflatable throat 402, thereby preparing for the fruit 400 to pass through the inflatable throat 402 once the fruit stem is severed.

Figure 6C:
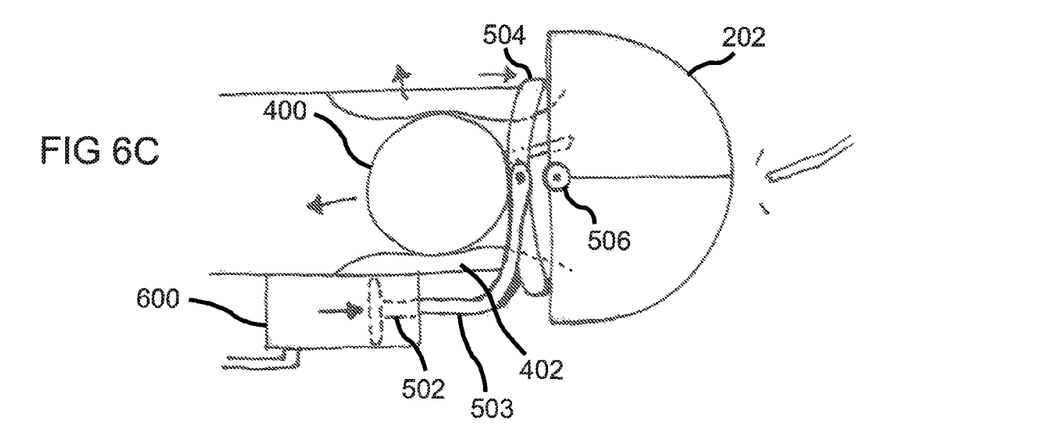
FIG. 6C is a side view illustration of the preferred embodiment of FIG. 6A, with the clamshell cutter device shown in a fully closed configuration.

FIG. 6C is a side view illustration of the preferred embodiment of FIG. 6A, showing the clamshell cutter device 202 in the fully closed configuration. The piston 502 is fully extended towards the clamshell cutter device 202, and the ring 504 has pushed against the interior side of the clamshell cutter device 202 until it has completely closed. Having previously sensed the drop in air pressure due to the proximity of the fruit 400 to the inflatable throat 402, the control unit has allowed a sufficient amount of air to escape from the interior of the inflatable throat 402 so as to enable the fruit 400 to pass through the inflatable throat 402 and eventually through the flexible conduit 110 and into the receptacle 112.

Figure 7A:
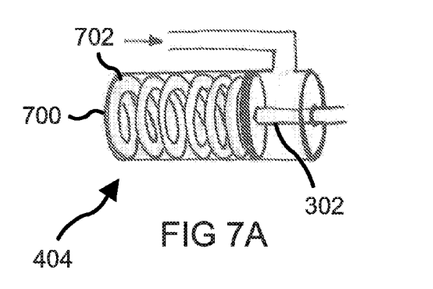
FIG. 7A is a side transparent illustration of the pneumatic cylinder and piston depicted in FIG. 3.

FIG. 7A is a transparent side view illustration of the pneumatic piston 700 and cylinder assembly 404 depicted in FIG. 4A. A spring 702 contained within the cylinder 700 holds a pneumatic piston 302 in its rest position when no additional air has been introduced into cylinder 700. When air is introduced into the cylinder 700, the piston 302 moves away from the clamshell cutter device 202, and the spring 702 is compressed. When the air pressure is released, the spring 702 returns the piston 302 to its usual position. In similar embodiments, the return spring is located elsewhere in the mechanism, and not inside of the pneumatic cylinder.

Figure 7B:
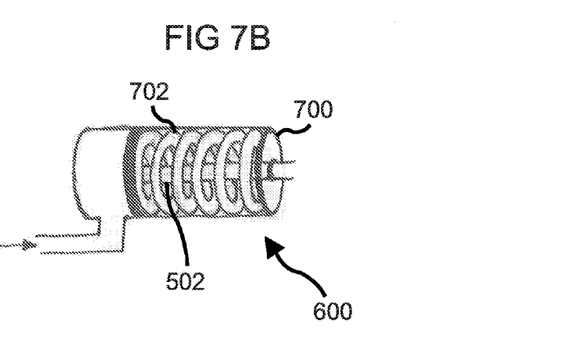
FIG. 7B is a side transparent illustration of the pneumatic cylinder and piston depicted in FIG. 5.

FIG. 7B is a side view illustration of the pneumatic cylinder 704 and piston assembly 600 depicted in FIG. 6A. A spring 706 located inside of the cylinder 704 holds the piston 502 in its rest position when no additional air has been introduced into the cylinder 704. When air is introduced into the cylinder 704, the piston 502 moves towards the clamshell cutter device 202. The spring 706 is compressed, and when the air pressure is released a moment later, the spring 706 returns the piston 502 to its rest position. In similar embodiments, the return spring is located elsewhere in the mechanism, and not inside of the pneumatic cylinder.

Figure 7C:
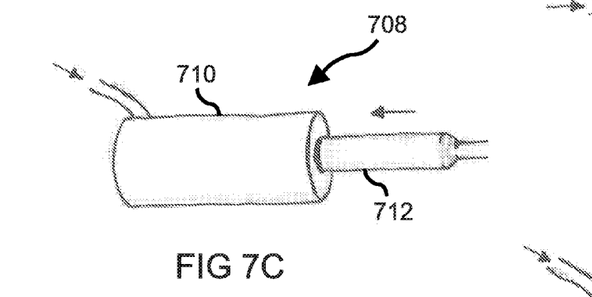
FIG. 7C is a side opaque illustration of a pull-type linear solenoid which is used in embodiments as an alternative to the cutter actuator shown in FIG. 3.

FIG. 7C is a side view illustration of a pull-type linear solenoid 708 which is used in place of a pneumatic cylinder and piston assembly in some embodiments that include the cutter actuator 300 shown in FIG. 3. When an electric voltage is applied to a solenoid coil contained within the solenoid body 710, a magnetic field is created which pulls a magnetized armature rod 712 into the solenoid body 710, and away from the clamshell cutter device 202. When the magnetic field is switched off, a return spring located inside of the solenoid body returns the armature rod 712 to its rest position. In similar embodiments, the return spring is located elsewhere in the mechanism, and not inside of the solenoid body.

Figure 7D:
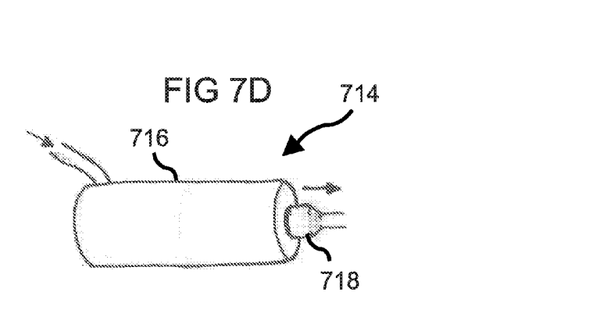
FIG. 7D is a side view illustration of a push-type linear solenoid which is used in embodiments as an alternative to the cutter actuator shown in FIG. 5.

FIG. 7D is a side view illustration of a push-type linear solenoid 714 that is used in place of a pneumatic cylinder and piston assembly in some embodiments that include the cutter actuator 500 shown in FIG. 5. When an electric voltage is applied to a solenoid coil within the solenoid body 716, a magnetic field is generated which pushes a magnetized armature rod 718 outward from the solenoid body 716, and toward the clamshell cutter device 202. When the magnetic field is switched off, a return spring located inside of the solenoid body returns the armature rod 718 to its rest position. In similar embodiments, the return spring is located elsewhere in the mechanism, and not inside of the pneumatic cylinder.

Figure 8A:
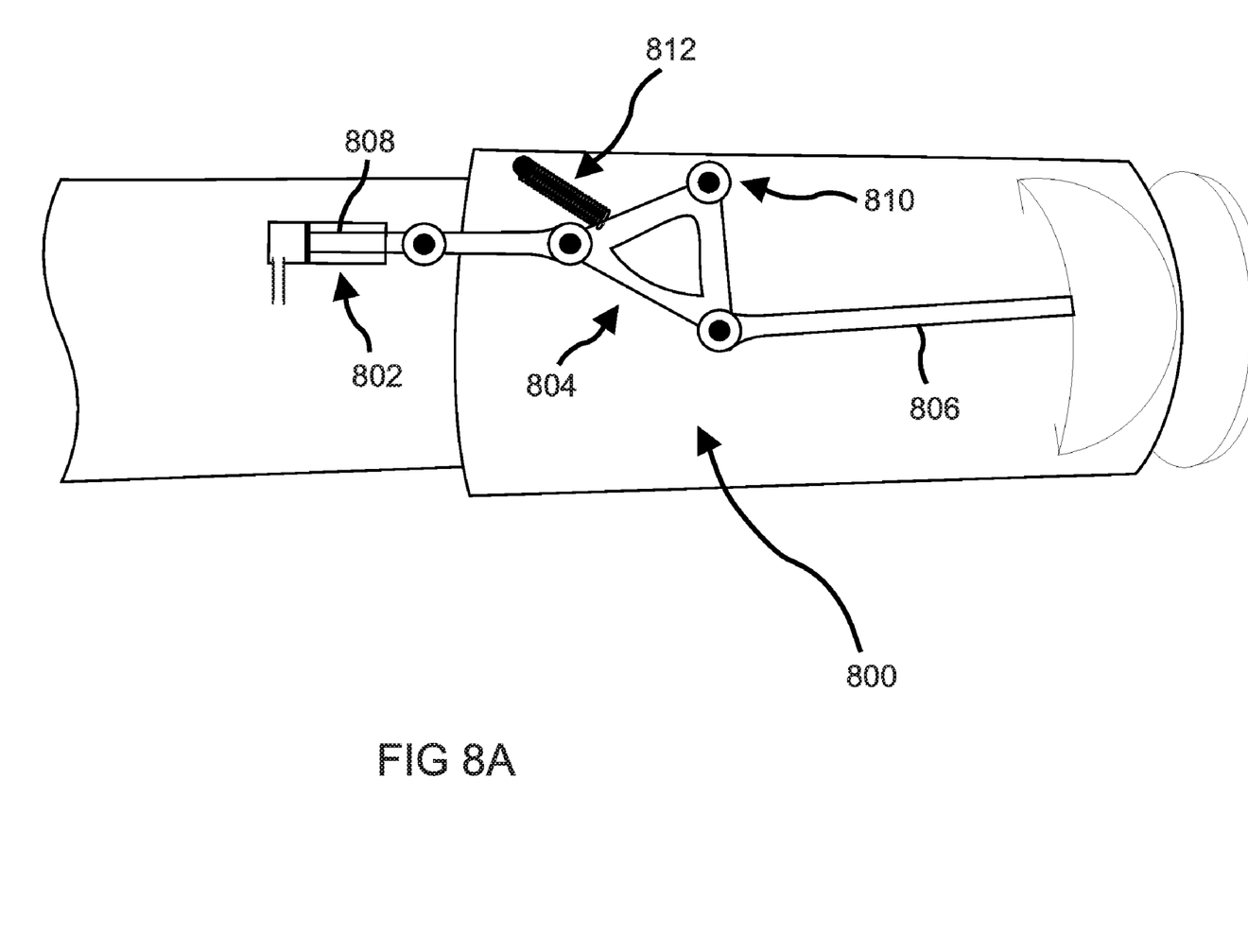
FIG. 8A is a side view illustration of a cutter actuator including a pneumatic piston and cylinder, a rotatable drive component, and an actuator arm.

FIG. 8A is a side view illustration of a preferred embodiment of a cutter actuator 800 including a pneumatic cylinder and piston assembly 802, a rotatable drive component 804 and an actuator arm 806. In this embodiment, air forced into the pneumatic cylinder 802 pushes a piston 808 which forces the rotatable drive component 804 to pivot about a fulcrum 810, thereby magnifying the range of motion of the piston 808 and pushing the actuator arm 806. The actuator arm 806 pushes half of the clamshell cutter device 202 into the closed position. A similar arrangement of elements (not shown) located on the other side of the cutter head 100 simultaneously closes the other half of the clamshell cutter device 202. When the air pressure is released a from the pneumatic cylinder 802, a spring 812 returns the rotatable drive component 804 to its original rest position, thereby retracting the actuator arm 806 and opening the clamshell cutter device 202. In this embodiment, the actuator arm 806 and rotatable drive component 804 do not require special maintenance or adjustments, and the spring action is accomplished using a typical hardware spring 812, requiring no lubrication or unique specifications.

Figure 8B:
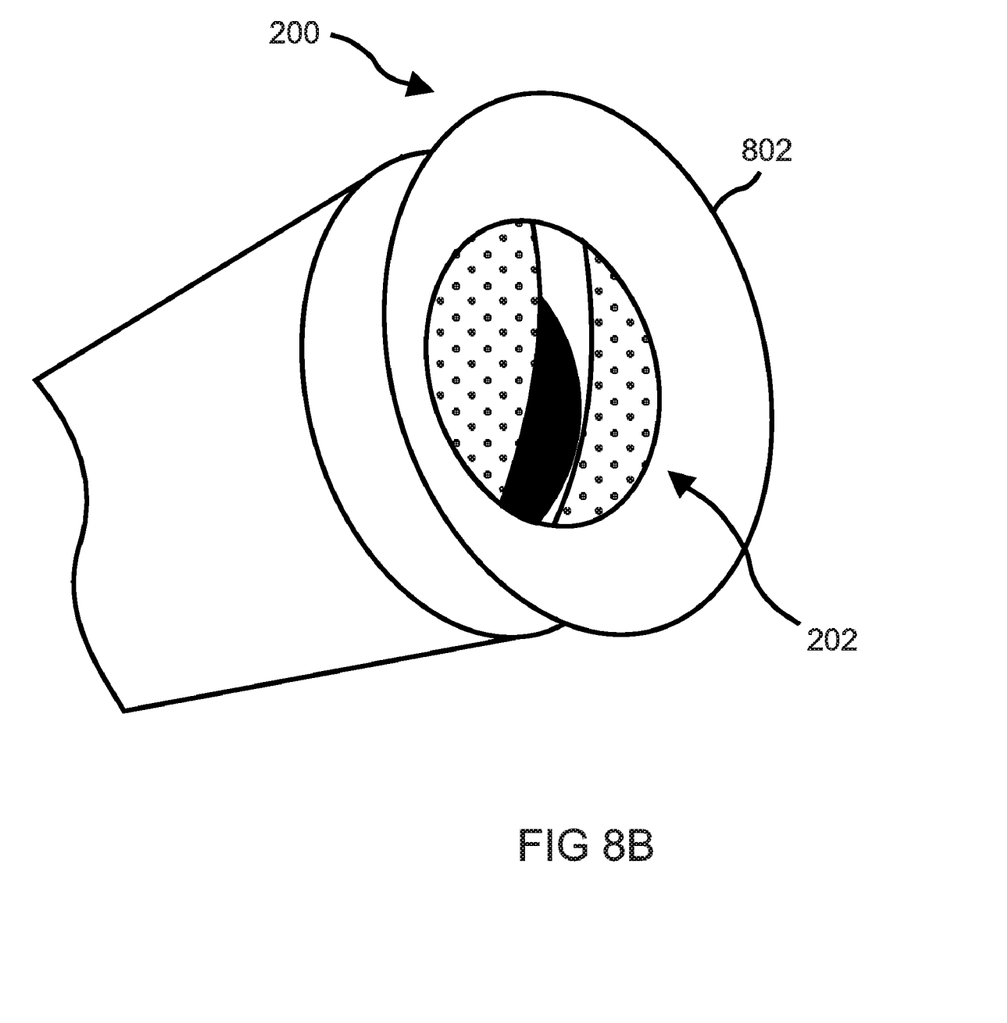
FIG. 8B is an enlarged oblique angle illustration of the clamshell cutter device operated by the cutter actuator shown in FIG. 8A.

FIG. 8B is an enlarged oblique angle illustration of the harvesting end of the preferred embodiment of FIG. 8A. The cutter head 200 of this preferred embodiment includes a funnel-shaped intake 802. The funnel-shaped intake 802 helps to position fruit against the inflatable diaphragm 402, and to align the fruit's stem properly so as to avoid less efficient angular cuts. The funnel-shaped intake 802 also helps to separate one piece of fruit from other pieces of nearby fruit.

Figure 9:
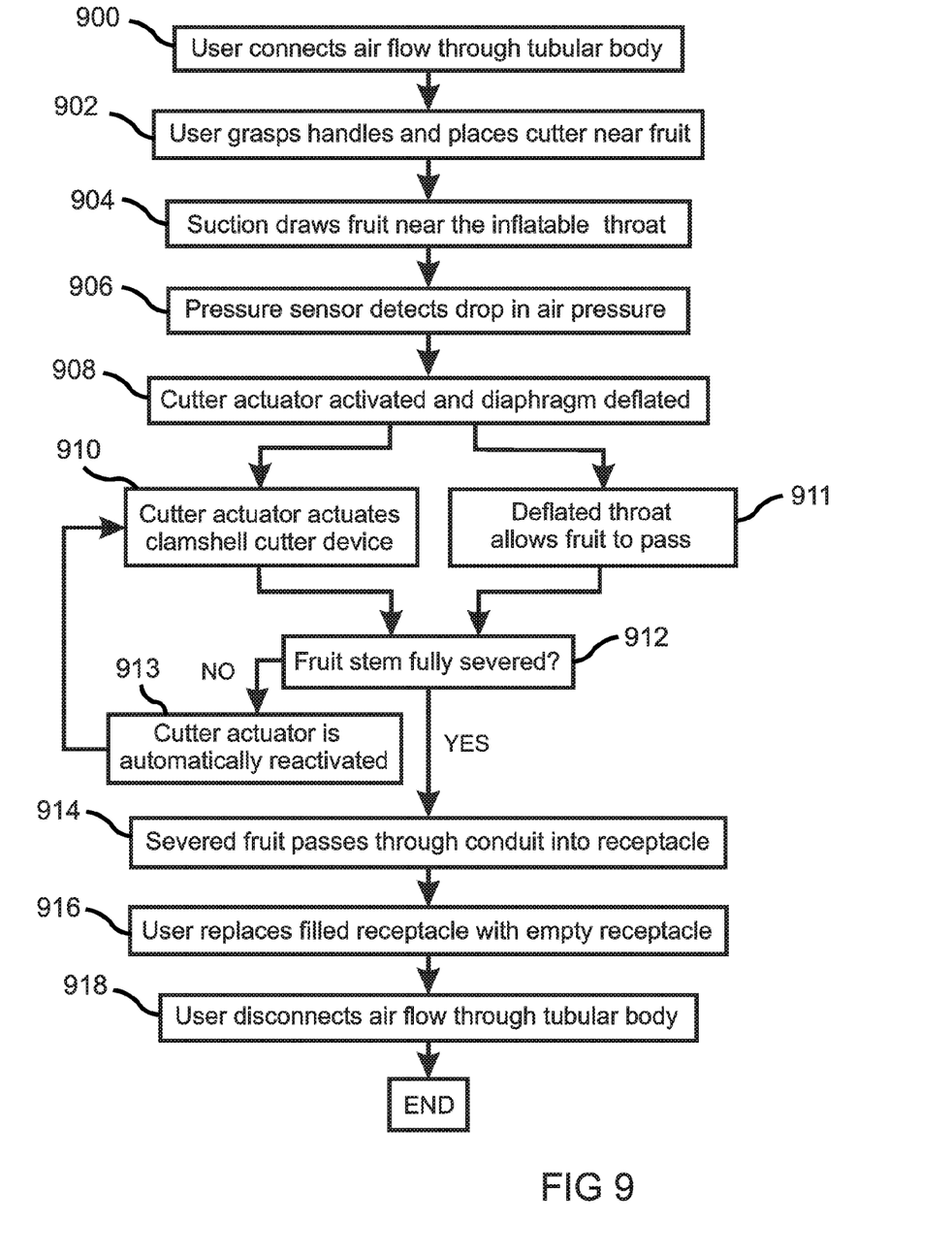
FIG. 9 is a flow diagram illustrating a preferred embodiment of the method of use of the invention.

FIG. 9 is a flow diagram that illustrates a preferred embodiment of the method of use of the invention. A user connects the air flow to the tubular body 100 of the apparatus, 900. Grasping the handles on the tubular body 100, the user places the cutter near a piece of fruit 400, 902. The suction caused by the air flow draws the fruit 400 into the harvesting end of the tubular body 100 and draws the fruit 400 into contact with the inflatable throat 402, 904. Contact between the piece of fruit and the inflatable throat 402 blocks the flow of air through the tubular body 100, and causes a drop in air pressure within the tubular body 100. A control unit with a pressure sensor then senses the drop in air pressure 906. Upon detecting this drop in air pressure, the control unit actuates the clamshell cutter actuator, and also begins releasing air from the diaphragm of the inflatable throat 402, 908. The cutter actuator actuates the clamshell cutter device 202, 910, while the inflatable throat 402 becomes sufficiently deflated so as to allow the fruit 400 to pass into the tubular body 100, 911.

If the clamshell cutter device 202 fully severs the fruit 400 stem when the cutter actuator is automatically activated by the control unit, the severed fruit 400 passes through the tubular body 100, through the flexible conduit 110, and into the receptacle 112, 912. In the rare event that the clamshell cutter device 202 does not succeed in fully severing the stem and freeing the fruit 400 from the tree within a preset amount of time after the cutter actuator has been automatically activated by the control unit, then the sensing unit timer will automatically reactivate the clamshell cutting mechanism, 913, causing the clamshell cutting mechanism to open and re-close. This can be repeated as many times as is required to fully sever the fruit 400 stem. In similar embodiments, a manual cutter switch is provided so as to enable a user to actuate the clamshell cutter device manually.

Once the stem is fully severed, the fruit 400 can pass through the deflated throat 402 and onto the receptacle 112, 914. When the receptacle 112 is filled with harvested fruit 400, the user can replace the full receptacle 112 with an empty receptacle 112 through various means, or empty the receptacle 112 through various conveyor methodologies, 916. When the user is completely finished using the harvesting apparatus, the user disconnects the air flow through the tubular body 100, 918.

Other modifications and implementations will occur to those skilled in the art without departing from the spirit and the scope of the invention as claimed. Accordingly, the above description is not intended to limit the invention except as indicated in the following claims.

What is claimed is:

1. A harvesting apparatus for harvesting generally spherical fruit, the harvesting apparatus comprising:
   an elongated tubular body having a harvesting end and a discharge end, the elongated tubular body being configured so as to allow a piece of fruit to pass therethrough;
   a clamshell cutting device located within the harvesting end, the clamshell cutting device including a single pair of opposing blades, the opposing blades being substantially shaped as partial spheres, with cutting edges that can be brought together by a pivotal motion of the blades, thereby severing the piece of fruit from an attached stem and allowing the piece of fruit to travel through the elongated tubular body and emerge from the discharge end;

a clamshell drive mechanism that can be actuated so as to cause the pair of opposing blades to pivot, thereby bringing their cutting edges together and then separating them; and a vacuum pump that drives air flow in the elongated tubular body.

2. The harvesting apparatus of claim 1, wherein the clamshell drive mechanism includes at least one of:

a pneumatic piston; and a linear solenoid.

3. The harvesting apparatus of claim 1, further comprising a manual cutter actuator that enables a user to manually actuate the clamshell drive mechanism.

4. The harvesting apparatus of claim 1, wherein the harvesting end includes a funnel-shaped orifice that tends to guide pieces of fruit into the harvesting end of the tubular body.

5. The harvesting apparatus of claim 1, wherein the elongated tubular body is able to conduct a flow of air through its length, the flow of air being generated by the vacuum pump, the flow of air being sufficient to draw a piece of fruit into the harvesting end and through the tubular body to the discharge end.

6. The harvesting apparatus of claim 5, further comprising a retractable throat, located within the harvesting end, and configured such that a piece of fruit in the retractable throat causes a consequent reduction of air pressure within the elongated tubular body.

7. The harvesting apparatus of claim 6, wherein the retractable throat includes a selectively inflatable member that blocks passage of a piece of fruit through the elongated tubular body when inflated and allows passage of a piece of fruit through the elongated tubular body when deflated.

8. The harvesting apparatus of claim 6, further comprising a control unit that includes:

an air pressure sensor configured to sense the reduction of air pressure within the elongated tubular body;

a first actuator configured to actuate the clamshell drive mechanism; and a second actuator configured to deflate the retractable throat.

9. The harvesting apparatus of claim 8, wherein the air pressure sensor is located between the retractable throat and the discharge end.

10. The harvesting apparatus of claim 8, wherein the control unit further includes a timer, and is able to automatically repeat the actuation of the clamshell drive mechanism if a reduction of air pressure persists for a specified duration of time after the actuation of the clamshell drive mechanism.

11. The harvesting apparatus of claim 1, further comprising a flexible conduit cooperative with the discharge end of the elongated tubular body, the flexible conduit being able to convey the piece of fruit from the discharge end to a receiving container.

12. The harvesting apparatus of claim 1, further comprising a receiving container suitable for collection of pieces of fruit after they have passed through the elongated tubular body and been discharged from the discharge end.

13. A harvesting apparatus for harvesting generally spherical fruit, the harvesting apparatus comprising:

an elongated tubular body having a harvesting end and a discharge end, the harvesting end having a funnel-shaped orifice configured to guide pieces of fruit into the harvesting end and through the tubular body to the discharge end;

a vacuum pump configured to draw air through the elongated tubular body from the harvesting end to the discharge end;

a retractable throat, located within the harvesting end;

a clamshell cutting device located within the harvesting end, the clamshell cutting device including a single pair of opposing blades, the opposing blades being substantially shaped as partial spheres, with cutting edges that can be brought together by a pivotal motion of the blades;

a clamshell drive mechanism that can be actuated so as to cause the pair of opposing blades to pivot, thereby bringing their cutting edges together and then separating them; and a control unit including:

an air pressure sensor configured to sense a reduction of air pressure within the elongated tubular body;

a first actuator configured to actuate the clamshell drive mechanism; and a second actuator configured to cause the retractable throat to retract sufficient to allow a piece of fruit to pass through the tubular body to the discharge end.

14. The harvesting apparatus of claim 13, wherein the clamshell drive mechanism includes at least one of:

a pneumatic piston; and a linear solenoid.

15. The harvesting apparatus of claim 13, further comprising a manual cutter actuator that enables a user to manually actuate the clamshell drive mechanism.

16. The harvesting apparatus of claim 15, wherein the retractable throat includes a selectively inflatable member that blocks passage of a piece of fruit through the elongated tubular body when inflated and allows passage of a piece of fruit through the elongated tubular body when deflated.

17. The harvesting apparatus of claim 13, wherein the air pressure sensor is located between the retractable throat and the discharge end.

18. The harvesting apparatus of claim 13, wherein the control unit further includes a timer configured to automatically repeat the actuation of the clamshell drive mechanism if the reduction of air pressure persists for a specified duration of time after the actuation of the clamshell drive mechanism.

19. The harvesting apparatus of claim 13, further comprising a flexible conduit cooperative with the discharge end of the elongated tubular body, the flexible conduit being able to convey the piece of fruit from the discharge end to a receiving container.

20. The harvesting apparatus of claim 13, further comprising a receiving container suitable for collection of pieces of fruit after they have passed through the elongated tubular body and been discharged from the discharge end.

* * * * *